United States Patent
Bernhardi et al.

(10) Patent No.: US 6,715,364 B2
(45) Date of Patent: Apr. 6, 2004

(54) METHOD FOR DETERMINING THE ELASTO-PLASTIC BEHAVIOR OF COMPONENTS CONSISTING OF ANISOTROPIC MATERIAL, AND APPLICATION OF THE PROCESS

(75) Inventors: Otto Bernhardi, Bad Schoenborn (DE); Roland Muecke, Windisch (CH)

(73) Assignee: Alstom Technology Ltd, Baden (CH)

( * ) Notice: Subject to any disclaimer, the term of this patent is extended or adjusted under 35 U.S.C. 154(b) by 0 days.

(21) Appl. No.: 10/119,937

(22) Filed: Apr. 11, 2002

(65) Prior Publication Data

US 2003/0000313 A1 Jan. 2, 2003

(30) Foreign Application Priority Data

Apr. 14, 2001  (DE) ......................................... 101 18 542

(51) Int. Cl.$^7$ ................................................. G01D 7/02
(52) U.S. Cl. .......................................... 73/789; 378/720
(58) Field of Search ............................... 73/789; 378/72

(56) References Cited

U.S. PATENT DOCUMENTS

| | | | | |
|---|---|---|---|---|
| 4,255,049 A | * | 3/1981 | Sahm et al. ................... | 73/762 |
| 5,490,195 A | * | 2/1996 | Berkley ........................ | 378/72 |
| 5,625,664 A | * | 4/1997 | Berkley ........................ | 378/72 |
| 5,625,958 A | * | 5/1997 | DeCoursey et al. .......... | 33/555 |

OTHER PUBLICATIONS

Yung–Li Lee et al., "A Constitutive Model for Estimating Multiaxial Notch Strains", Journal of Engineering Materials and Technology, Jan. 1995, vol. 117, Transactions of the ASME, ISSN 0094–4289, S.33–40.

R.L. Roche, "Use of Elastic Calculations in Analysis of Fatigue", Nuclear Engineering and Design 113, 1989, Nr. 3, ISSN 0029–5493, S.343–355.

K. Tanaka et al., "Fatigue Strength of a Rotor Steel Subjected to Torsional Loading Simulating That Occurring Due to Circuit Breaker Reclosing in an Electric Power Plant", Fatigue of Engineering Materials and Structures, vol. 6, No. 2, 1983, ISSN 0160–4112, S. 103–120.

R. A. Williams et al., "A Methodology for Predicting Torsional Fatigue Crack Initiation in Large Turbine–Generator Shafts", IEEE Transactions on Energy Conversion, vol. Ec–1, No. 3, Sep. 1986, ISSN 0885–8969, S.80–86.

V. Desikan et al., "Analysis of Material Nonlinear Problems Using Pseudo–Elastic Finite Element Method", Journal of Pressure Vessel Technology, Nov. 2000, vol. 122, ISSN 0094–9930, S.457–461.

* cited by examiner

Primary Examiner—Edward Lefkowitz
Assistant Examiner—Takisha S Miller
(74) Attorney, Agent, or Firm—Burns, Doane, Swecker & Mathis, L.L.P.

(57) ABSTRACT

In a method for determining the elasto-plastic behavior of components consisting of anisotropic material, in particular of gas turbine installations, at high temperatures, in which method, first of all, the linear-elastic behavior is determined and, on the basis of the linear-elastic results, the inelastic behavior is also taken into account by applying Neuber's rule, the anisotropic properties of the components, as occur in particular on account of the use of single crystal materials, are taken into account in a simple manner by using a modified anisotropic Neuber's rule of the form $$\sigma^{*2} = \sigma_{ep}^2 + \sigma_{ep}^2 \underline{D} \cdot \frac{\underline{E}}{E_R} \cdot \underline{D} \frac{\sigma_v^{*2}}{\sigma^{*2}} \alpha \left( \frac{\sigma_{ep}^2}{\sigma_0^2} \frac{\sigma_v^{*2}}{\sigma^{*2}} \right)^{n-1}$$

where $\underline{\sigma}^*$ = determined linear stress, $\sigma^*_v$ = determined linear Hill's comparative stress, $\underline{\sigma}_{ep}$ = estimated inelastic stress, $\underline{D}$ = directional vector of the elastic and inelastic stresses, $\underline{E}^{-1}$ = inverse stiffness matrix $E_R$ = reference stiffness, $\sigma_0$ = reference stress, and $\alpha, n$ = constant.

8 Claims, No Drawings

METHOD FOR DETERMINING THE ELASTO-PLASTIC BEHAVIOR OF COMPONENTS CONSISTING OF ANISOTROPIC MATERIAL, AND APPLICATION OF THE PROCESS

FIELD OF THE INVENTION

The present invention relates to the field of analysis and prediction of the behavior of mechanical components. It relates to a method for determining the elasto-plastic behavior of components in accordance with the preamble of claim 1.

BACKGROUND OF THE INVENTION

The components of gas turbines (rotor blades, guide vanes, liners, etc.) are generally so highly loaded that they have only a finite service life. It is necessary to predict this service life if gas turbines are to be designed safely and economically.

The load on the components is composed of forces, high thermal loads, oxidation and corrosion. The mechanical and thermal loads in many cases lead to fatigue in the components even after a few thousand load cycles. This low-cycle fatigue is reproduced in isothermic situations by LCF (low cycle fatigue) tests and in anisothermic situations by TMF (thermal mechanical fatigue) tests.

The stresses caused by the load are determined in the design phase of the gas turbine. The complexity of the geometry and/or load requires the use of the finite element (FE) method to determine the stresses. However, since necessary inelastic calculations are often not possible, generally for cost and time reasons, the service life prediction is almost exclusively based on linear-elastic stresses. Generally, only isothermal data (strain-controlled LCF tests) are available, and consequently even anisothermal cycles have to be evaluated using LCF data.

The measure used for the damage (damage law) in this case is the amplitude of the total comparative strain $\epsilon_{v,ep}$. If the required cycle number $N_{req}$ is to be reached in the component, the amplitude of the total comparative strain $\epsilon_{v,ep}$ must satisfy the relationship $$\epsilon_{v,ep} \leq \epsilon_a^M(T_{dam}, N_{req}) \quad (a)$$

at each location of the component. $\epsilon_a^M$ is the permissible total strain amplitude, which is determined from isothermal LCF tests. It is to be determined for different temperatures and cycle numbers. The temperature $T_{dam}$ on which the damage is based must be selected appropriately for a cycle with varying temperature.

If the decisive load acts for several minutes at high temperatures, it is necessary to reckon with additional damage. To establish the reduced service life on account of the accumulation of damage from creep fatigue and cyclic fatigue, LCF data are determined from tests with a holding time.

The extent of damage $\epsilon_{v,ep}$ corresponds to the strain amplitude of a balanced cycle. This cycle is determined from the cycle analyzed in linear-elastic form via a modified Neuber's rule:

$$\underline{\sigma}^* \cdot \underline{\epsilon}^* = \underline{\sigma}_{ep} \cdot \underline{\epsilon}_{ep} \quad (b)$$

with the vector of the linear-elastic stress amplitude $\underline{\sigma}^*$, the vector of the elastic-plastic stress amplitude $\underline{\sigma}_{ep}$, the vector of the linear-elastic strain amplitude $\underline{\epsilon}^*$ and the vector of the total elastic-plastic strain amplitude $\underline{\epsilon}_{ep}$. The degree of damage $\underline{\epsilon}_{v,ep}$ is determined via a comparison hypothesis from the vector of the total elastic-plastic strain amplitude $\underline{\epsilon}_{ep}$.

The cyclic σ-ε curve required to determine the total elastic-plastic strain amplitude $\underline{\epsilon}_{ep}$ is represented analytically by a modified Ramberg-Osgood model:

Then, Neuber's rule can be used to approximately record the inelastic effects occurring in gas turbine components (blades, vanes, combustion chambers). These effects must be taken into account when predicting the service life of the structures. Hitherto, however, Neuber's rule (b) has only been known for materials with an isotropic mechanical behavior.

Since, on account of its special properties, (anisotropic) single crystal material is increasingly being employed in gas turbine construction for the components, especially the turbine blades and vanes, it would be desirable in order to design the components—in particular with a view to determining the service life under cyclic loads—to have available a calculation method which is analogous to that used for isotropic materials.

SUMMARY OF THE INVENTION

Therefore, it is an object of the invention to provide a method for the approximate determination of the elasto-plastic behavior of single crystal materials at high temperatures which can be used in particular to determine the service life of components of a gas turbine installation made from single crystal material.

The object is achieved by the combination of features described in claim 1. The essence of the invention consists in using a modified anisotropic Neuber's rule of the form $$\underline{\sigma}^* \cdot \underline{\epsilon}^* = \underline{\sigma}^* \cdot \underline{\underline{E}}^{-1} \cdot \underline{\sigma}^* = \underline{\sigma}_{ep} \cdot \underline{\underline{E}}^{-1} \cdot \underline{\sigma}_{ep} + \underline{\sigma}_{ep} \cdot \frac{\partial \sigma_{v,ep}^2}{\partial \underline{\sigma}_{ep}} \frac{\alpha}{E_R} \left( \frac{\sigma_{v,ep}^2}{\sigma_0^2} \right)^{n-1}$$

to take account of anisotropic properties of the components as occur in particular through the use of single crystal materials.

The following relationships $$\underline{\sigma}^* = \underline{D} \sqrt{\sigma^{*2}}$$

and $$\underline{\sigma}_{ep} = \underline{D} \sqrt{\sigma_{ep}^2}$$

are preferably assumed for the variables $\underline{\sigma}^*$ and $\underline{\sigma}_{ep}$, where $\underline{D}$ denotes a directional vector of length 1, and the relationships $\underline{\sigma}^* \cdot \underline{\sigma}^* = \sigma^{*2}$ and $\underline{\sigma}_{ep} \cdot \underline{\sigma}_{ep} = \sigma_{ep}^2$ apply, and the modified Neuber's rule in the form $$\sigma^{*2} = \sigma_{ep}^2 + \sigma_{ep}^2 \underline{D} \cdot \frac{\underline{\underline{E}}}{E_R} \cdot \underline{D} \frac{\sigma_v^{*2}}{\sigma^{*2}} \alpha \left( \frac{\sigma_{ep}^2}{\sigma_0^2} \frac{\sigma_v^{*2}}{\sigma^{*2}} \right)^{n-1}$$

is used, with an anisotropic correction term $$\underline{D} \cdot \frac{\underline{\underline{E}}}{E_R} \cdot \underline{D}$$

and an inelastic correction term $$\frac{\sigma_v^{*2}}{\underline{\sigma}^{*2}}$$

According to a preferred configuration of the method, the equation according to the modified Neuber's rule is solved using an iterative method, in particular a Newton iteration.

According to the invention, the method is used to determine the service life of gas turbine components which are under a cyclic load.

DETAILED DESCRIPTION OF THE INVENTION

The materials model on which the invention is based is derived from a plastic potential:

$$\Omega = \frac{\alpha \sigma_0^2}{E_R n} \left( \frac{\sigma_{v,ep}^2}{\sigma_0^2} \right)^n \tag{1}$$

where $E_R$ is the "reference" stiffness. $E_R$ is carried over in order to obtain the formal similarity of the set of formulae to that used in the known isotropic situation. $E_R$ is expediently selected to be of the order of magnitude of the elastic constant of the material under consideration, e.g. $E_R$=100000 Nmm$^{-2}$, $\Omega$ is the plastic potential of the material, from which the plastic strains are calculated by derivation from the stresses, $\underline{\sigma}_{ep}$=$[\sigma_{xx}, \sigma_{yy}, \ldots]$ is the "vector" of the stresses, and $\sigma_{v,ep}$ is an anistropic comparative stress (cf. below).

The plastic strains then result as $$\varepsilon_{pi} = \frac{\partial \Omega}{\partial \underline{\sigma}_{ep}} \tag{2}$$

Therefore, by partial derivation with respect to the stresses $\underline{\sigma}_{ep}$, the plastic strains $\underline{\varepsilon}_{pl}$ are formed from the plastic potential $\Omega$.

Equations (1) and (2) result in $$\frac{\partial \Omega}{\partial \underline{\sigma}_{ep}} = \frac{1}{2} \frac{\partial \sigma_{v,ep}^2}{\partial \underline{\sigma}_{ep}} \frac{\alpha}{E_R} \left( \frac{\sigma_{v,ep}^2}{\sigma_0^2} \right)^{n-1}. \tag{3}$$

$\sigma_{v,ep}$ is the (anisotropic) comparative stress. In the present anisotropic situation, it is possible to use the HILL comparative stress:

$$\sigma_{v,ep}^2 = [F(\sigma_{yy} - \sigma_{zz})^2 + G(\sigma_{zz} - \sigma_{xx})^2 + \tag{4}$$
$$H(\sigma_{xx} - \sigma_{yy})^2 + 2L\sigma_{yz}^2 + 2M\sigma_{zx}^2 + 2N\sigma_{xy}^2] \cdot \frac{1}{2}$$

This is the general case with six independent plastic materials constants F, G, H and L, M and N. The special case where 1=F=G=H=3L=3M=3N results in the known von-Mises comparative stress for isotropic materials; the special case with two independent parameters F=G=H and L=M=N results in the formulation for cubic crystal symmetry, which in this case is of interest for single crystal materials (e.g. CMSX-4).

Equation (3) gives $$\varepsilon_{pl} = \varepsilon_v \frac{\partial \sigma_{v,ep}^2}{\partial \underline{\sigma}_{ep}} \tag{5}$$

with the "directional vector"

$$\frac{\partial \sigma_{v,ep}^2}{\partial \underline{\sigma}} = \begin{pmatrix} -G(\sigma_{zz} - \sigma_{xx}) + H(\sigma_{xx} - \sigma_{yy}) \\ F(\sigma_{yy} - \sigma_{zz}) - H(\sigma_{xx} - \sigma_{yy}) \\ -F(\sigma_{yy} - \sigma_{zz}) + G(\sigma_{zz} - \sigma_{xx}) \\ 2N\sigma_{xy} \\ 2M\sigma_{zx} \\ 2L\sigma_{yz} \end{pmatrix} \tag{6}$$

and the "comparative strain"

$$\varepsilon_v = \frac{\alpha}{E_R} \cdot \left( \frac{\sigma_{v,ep}^2}{\sigma_0^2} \right)^{n-1} \tag{7}$$

For the single crystal materials with cubic symmetry which are of interest here, the linear-elastic materials equation becomes $$\underline{\underline{E}}^{-1} = \begin{pmatrix} 1/E & -v/E & -v/E & 0 & 0 & 0 \\ -v/E & 1/E & -v/E & 0 & 0 & 0 \\ -v/E & -v/E & 1/E & 0 & 0 & 0 \\ 0 & 0 & 0 & 1/G & 0 & 0 \\ 0 & 0 & 0 & 0 & 1/G & 0 \\ 0 & 0 & 0 & 0 & 0 & 1/G \end{pmatrix} \tag{8}$$

E, G and v are the independent elastic materials constants for cubic symmetrical (single crystal) materials.

The complete anisotropic Ramberg-Osgood materials law results, as the sum of the elastic and plastic strains, as $$\underline{\varepsilon}_{ep} = \underline{\underline{E}}^{-1} \cdot \underline{\sigma}_{ep} + \frac{\partial \sigma_{v,ep}^2}{\partial \underline{\sigma}_{ep}} \frac{\alpha}{E_R} \left( \frac{\sigma_{v,ep}^2}{\sigma_0^2} \right)^{n-1} \tag{9}$$

In this equation, $\underline{\varepsilon}_{ep}$ and $\underline{\sigma}_{ep}$ are the strains and stresses estimated according to the anisotropic Neuber's rule.

As in the case of the isotropic Neuber's rule, the work of the linear variables and the work of the inelastic variables are equated:

$$\underline{\sigma}^* \cdot \underline{\varepsilon}^* = \underline{\sigma}^* \cdot \underline{\underline{E}}^{-1} \cdot \underline{\sigma}^* = \underline{\sigma}_{ep} \cdot \underline{\underline{E}}^{-1} \cdot \underline{\sigma}_{ep} + \underline{\sigma}_{ep} \cdot \frac{\partial \sigma_{v,ep}^2}{\partial \underline{\sigma}_{ep}} \frac{\alpha}{E_R} \left( \frac{\sigma_{v,ep}^2}{\sigma_0^2} \right)^{n-1} \tag{10}$$

In this case, $\underline{\varepsilon}^*$ and $\underline{\sigma}^*$ are the strains and stresses determined using the linear FE calculation.

Equation (10) immediately gives $$\sigma^{*2} = \sigma_{ep}^2 + \underline{\sigma}_{ep} \cdot \frac{E}{E_R} \cdot \frac{\partial \sigma_{v,ep}^2}{\partial \underline{\sigma}_{ep}} \alpha \left( \frac{\sigma_{v,ep}^2}{\sigma_0^2} \right)^{n-1} \tag{11}$$

Here, the additional assumption is introduced, since the elastic stresses should be proportional to the elastic stresses (from the finite element calculation). In other words, it is assumed that the direction of the stress does not change in the stress space if one changes from the elastic stresses $\sigma^*$ to the estimated inelastic stresses. As a result, the "directional vector" $\underline{D}$ can be determined from $$\underline{\sigma}^* = \underline{D}\sqrt{\sigma^{*2}} \qquad (12)$$

Now, for the inelastic (estimated) stresses, with the same directional vector, the following applies:

$$\underline{\sigma}_{ep} = \underline{D}\sqrt{\sigma_{ep}^2} \qquad (13)$$

It follows for the comparative stresses of the elastic (finite element) results that $$\sigma_v^{*2} = \frac{1}{2}[F(D_{yy} - D_{zz})^2 + \ldots ]\sigma^{*2} \qquad (14)$$

Accordingly, the following equation applies for the elasto-plastic comparative stresses $$\sigma_{v,ep}^2 = \frac{1}{2}[F(D_{yy} - D_{zz})^2 + \ldots ]\sigma_{ep}^2 \qquad (15)$$

This results in $$\frac{\sigma^{*2}}{\sigma_v^{*2}} = \frac{\sigma_{ep}^2}{\sigma_{v,ep}^2} \qquad (16)$$

The inelastic comparative stress can now be expressed by the product of the "length" of the elasto-plastic stress vector and an "anisotropy factor"

$$\sigma_{v,ep}^2 = \sigma_{ep}^2 \frac{\sigma_v^{*2}}{\sigma^{*2}} \qquad (17)$$

This results, for the derivation of the elasto-plastic comparative stress with respect to the elasto-plastic stresses, in $$\frac{\partial \sigma_{v,ep}^2}{\partial \underline{\sigma}_{ep}} = \frac{\partial \sigma_{ep}^2}{\partial \underline{\sigma}_{ep}} \frac{\sigma_v^{*2}}{\sigma^{*2}} = \underline{\sigma}_{ep} \frac{\sigma_v^{*2}}{\sigma^{*2}} \qquad (18)$$

This directly leads to $$\sigma^{*2} = \sigma_{ep}^2 + \sigma_{ep}^2 \underline{D} \cdot \frac{\underline{E}}{E_R} \cdot \underline{D} \frac{\sigma_v^{*2}}{\sigma^{*2}} \alpha \left(\frac{\sigma_{ep}^2}{\sigma_0^2} \cdot \frac{\sigma_v^{*2}}{\sigma^{*2}}\right)^{n-1} \qquad (19)$$

The anisotropic elastic correction term $$\underline{D} \cdot \frac{\underline{E}}{E_R} \cdot \underline{D} \qquad (20)$$

is a scalar variable which can easily be calculated from the elastic stresses and the stiffness matrix. The inelastic correction term $$\frac{\sigma_v^{*2}}{\sigma^{*2}} \qquad (21)$$

is likewise a scalar variable which can be determined from the elastic stresses together with the anisotropic parameters (Hill's constants F,G, ... ). The above equation (19) for $\sigma_{ep}^2$ can be solved, as in the case of the "classic" Neuber's rule, using an iterative method (Newton iteration). When $\sigma_{ep}^2$ has been determined, the elasto-plastic stress vector can be calculated immediately with the aid of $\underline{D}$.

To rework the "linear" results of the finite element calculations, it is expedient to implement the above procedure in a post-processing program which reads the "linear" data for the strains and stresses as result files from the FE programs and processes this data further to form the desired inelastic results. In the case of the isotropic Neuber's rule, this is part of the prior art. This prior art can very easily be widened to cover the anisotropic Neuber's rule described here by incorporating the two "correction factors" mentioned above in the iteration procedure.

What is claimed is:

1. A method for determining the elasto-plastic behavior at high temperatures of a component formed of anisotropic material, the method comprising;
  (a) determining a linear-elastic behavior of the component; and
  (b) on the basis of the linear-elastic results, applying a modified anisotropic Neuber's rule of the form:

$$\underline{\sigma}^* \cdot \underline{\varepsilon}^* = \underline{\sigma}^* \cdot \underline{\underline{E}}^{-1} \cdot \underline{\sigma}^* = \underline{\sigma}_{ep} \cdot \underline{\underline{E}}^{-1} \cdot \underline{\sigma}_{ep} + \underline{\sigma}_{ep} \cdot \frac{\partial \sigma_{v,ep}^2}{\partial \underline{\sigma}_{ep}} \frac{\alpha}{E_R} \left(\frac{\sigma_{v,ep}^2}{\sigma_0^2}\right)^{n-1}$$

where
  $\underline{\sigma}^*$=determined linear stress,
  $\underline{\varepsilon}^*$=determined linear strain,
  $\underline{\sigma}_{ep}$=estimated inelastic stress,
  $\sigma_{v,ep}$=Hill's elastic-plastic comparative stress,
  $\underline{\underline{E}}^{-1}$=inverse stiffness matrix
  $E_R$=reference stiffness,
  $\sigma_0$=reference stress, and
  $\alpha,n$=constant.
  whereby the anisotropic properties of the component are taken into account.

2. The method as claimed in claim 1, wherein the following relationships $$\underline{\sigma}^* = \underline{D}\sqrt{\sigma^{*2}}$$

and $$\underline{\sigma}_{ep} = \underline{D}\sqrt{\sigma_{ep}^2}$$

are assumed for the variables $\underline{\sigma}^*$ and $\underline{\sigma}_{ep}$, where $\underline{D}$ denotes a directional vector of length 1, and in that the modified Neuber's rule is used in the form $$\sigma^{*2} = \sigma_{ep}^2 + \sigma_{ep}^2 \underline{D} \frac{\underline{E}}{E_R} \cdot \underline{D} \frac{\sigma_v^{*2}}{\sigma^{*2}} \alpha \left(\frac{\sigma_{ep}^2}{\sigma_0^2} \frac{\sigma_v^{*2}}{\sigma^{*2}}\right)^{n-1}$$

with anisotropic correction term $$\underline{D} \cdot \frac{\underline{E}}{E_R} \cdot \underline{D}$$

and an inelastic correction term $$\frac{\sigma_v^{*2}}{\sigma^{*2}}.$$

where $\sigma^*_v$ = Hill's linear-elastic comparative stress.

3. The method as claimed in claim 2, wherein the equation according to the modified Neuber's rule is solved using an iterative method, 4. The method as claimed in claim 1 for determining the service life of gas turbine components which are under cyclic load.

5. The method of claim 3, wherein the iterative method is a Newton iteration.

6. The method of claim 1, wherein the component is in a gas turbine installation.

7. The method of claim 1, wherein the component is formed of a single-crystal material.

8. The method of claim 1, wherein the component is formed of a directionally solidified material.

* * * * *